United States Patent
Lincoln

[15] 3,667,133
[45] June 6, 1972

[54] METHOD AND APPARATUS FOR COOLING CEMENT CLINKER

[72] Inventor: Roland L. Lincoln, Macungie, Pa.
[73] Assignee: Fuller Company
[22] Filed: Apr. 9, 1970
[21] Appl. No.: 26,958

[52] U.S. Cl. .................................................. 34/20, 34/72
[51] Int. Cl. ...................................................... F26b 5/00
[58] Field of Search ...................... 34/20, 57 B, 54, 57 R, 72, 34/131; 165/40, 110, 157, 158; 62/218, 506

[56] References Cited

UNITED STATES PATENTS

| | | | |
|---|---|---|---|
| 3,504,739 | 4/1970 | Pearce | 165/158 |
| 2,531,343 | 11/1950 | Patterson | 34/20 X |
| 2,846,778 | 8/1958 | Markle, Jr. | 34/85 X |
| 3,477,729 | 11/1969 | Hershey | 165/40 |
| 2,437,577 | 3/1948 | Williams | 62/218 X |

OTHER PUBLICATIONS

" Fuller Inclined-Grate Cooler, Bulletin Co- 4," (p. 3, 4) Fuller Company, Catasauqua, Pa.

*Primary Examiner*—Frederick L. Matteson
*Assistant Examiner*—W. C. Anderson
*Attorney*—Jack L. Prather and Frank H. Thomson

[57] ABSTRACT

A method and apparatus for cooling cement clinker which includes a conventional clinker cooler wherein clinker to be cooled is supported on a grate and moved from a kiln through the cooler and cooling air is blown through and around the clinker. The air is heated and entrains solids from the hot clinker. Some of the hot air is returned to the kiln and the rest of it is directed to a dust collector and then to an air cooler. From the air cooler, the air is recirculated to be blown through a new supply of hot clinker. The cooler is a tank having a plurality of gas tubes therethrough with water filling the tank and surrounding the tubes. The disclosure also sets forth that hot air may leave the clinker cooler, go directly to the air cooler and then to a conventional bag filter where clean air is exhausted to atmosphere. In this instance, ambient air is blown through the hot clinker.

11 Claims, 3 Drawing Figures

INVENTOR
ROLAND L. LINCOLN

BY Frank H Thomson

ATTORNEY

METHOD AND APPARATUS FOR COOLING CEMENT CLINKER

BACKGROUND OF THE INVENTION

This invention relates to clinker coolers and in particular to a method and apparatus for cooling cement clinker which will substantially reduce the initial investment required for equipment necessary for cooling cement clinker. In particular the invention relates to a means for cooling the air heated by the cement clinker and a method and apparatus for recirculating the air used to cool the cement clinker.

In the production of cement, hot cement clinker is discharged from a kiln into a clinker cooler such as that shown in U.S. Pat. No. 2,846,778 where it is supported on a movable grate which moves the hot clinker through the clinker cooler. As the clinker moves through the clinker cooler, air is blown through the hot clinker to cool the clinker. As the cooling air moves through the hot clinker, it is heated and entrains solid material. Some of this hot air is returned to the kiln to be used in the cement making process. The remainder of the hot air is exhausted from the clinker cooler. Prior to the present invention, the hot air exhausted from the clinker cooler was passed through a filtering system to remove dust entrained in the hot air and the filtered hot air was exhausted to atmosphere.

During the clinker cooling process "flooding" often occurs. "Flooding" occurs when clinker dams up in the entrance of the clinker cooler, the dam breaks and a sudden large volume of clinker will flow into the clinker cooler. This sudden large volume of hot clinker will cause a great increase in the temperature of air which is exhausted from the clinker cooler.

Conventionally, a bag house filter is employed for removing dust from the heated air. During flooded conditions the air is abruptly heated to such an extent that the flooded condition will cause "burn out" of a bag house which is adequate during normal operating conditions. Such a "burn out" can result in the destruction of the bag house and the shutting down of the cement making process. In order to compensate for flooded conditions, present practice dictates the use of an oversize bag house. In addition, an air dilution damper or a spray type cooler for spraying cooling water into the hot air is used to reduce the temperature of the air exhausted from the clinker cooler during flooded conditions. The oversize bag house and the spray cooler or air dilution damper greatly increase the initial investment required in a clinker cooling system. In addition, the temperature responsive spray cooler or air dilution damper arrangements are often too slow or not sufficiently reliable to adequately compensate for the abrupt increase in temperature which occurs during flooded conditions.

In order to reduce the initial investment required for a clinker cooling system, it would be desirable to eliminate the use of a high efficiency collector such as a bag house or electrostatic precipitator. However, in most localities, statutes require the use of an adequate filtering system if the air is to be discharged into the atmosphere. A bag house filter has proved to be one of the most effective filtering systems. By the present invention, it has been found that the bag house or other high efficiency collector can be eliminated by recirculating the air through the clinker cooler and not exhausting it to atmosphere. If it is desired to exhaust the air to atmosphere, the bag house can be reduced in size from that required by present practice.

SUMMARY

It is therefore the principal object of this invention to provide an apparatus for cooling cement clinker which will reduce the initial investment required in a clinker cooling system.

It is another object of this invention to provide a clinker cooling system which will eliminate the necessity of using a bag house filter or other high efficiency dust collector.

It is a further object of this invention to provide a clinker cooling apparatus which will substantially reduce the likelihood of the destruction of a bag house filter in the event of flooded conditions.

It is a still further object of this invention to provide a novel air cooler for use in combination with a clinker cooling system.

It is still another object of this invention to provide a method of cooling cement clinker which is more efficient in its operation and eliminates the hazards connected with flooding of the clinker cooler.

In general, the foregoing and other objects will be carried out by providing an apparatus for cooling cement clinker comprising a housing defining a chamber; inlet means at one end of said housing for receiving cement clinker from a kiln and admitting it into said chamber; outlet means at the other end of said housing for discharging cooled cement clinker from said chamber; grate means for supporting said clinker within said chamber; blower means for blowing cooling gas into said chamber and through said cement clinker for cooling said cement clinker whereby said gas is heated by said clinker and solid material is entrained in said gas; a gas cooler; first conduit means for conducting some of said heated gas from said chamber to said gas cooler; second conduit means for conducting cooled gas from said gas cooler to said blower means; and dust collector means flow connected to one of said first and second conduit means for removing solid materials from said gas. In general, the method of this invention is carried out by supporting a supply of hot material to be cooled on a grate; blowing cooling air through said material; removing at least some of the solid material from the air which passes through said material; cooling the air; and blowing the cooled air through a new supply of material to be cooled.

BRIEF DESCRIPTION OF THE DRAWINGS

The invention will be described in connection with the annexed drawings wherein.

DESCRIPTION OF THE PREFERRED EMBODIMENTS

Figure 1:
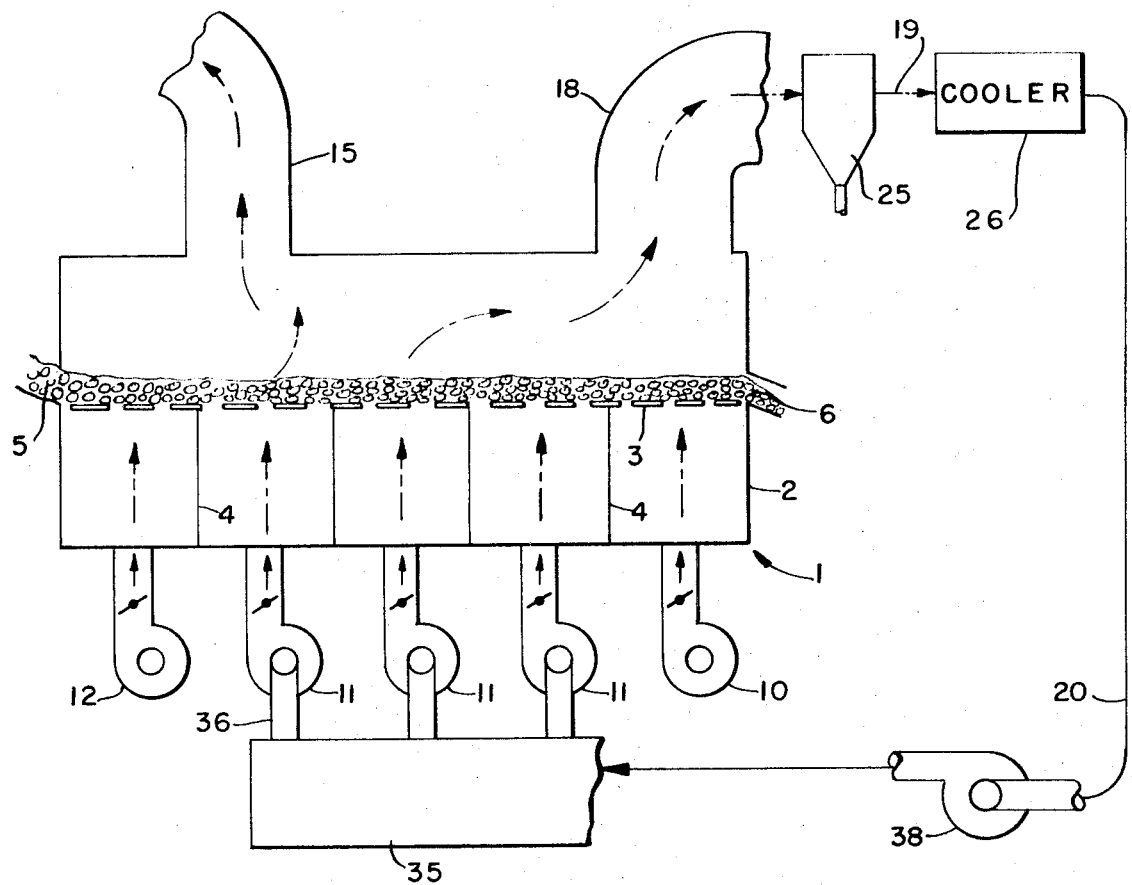
FIG. 1 is a generally schematic view of the apparatus of the present invention.

Referring to FIG. 1, a conventional clinker cooler is diagramatically indicated at 1. The clinker cooler 1 may be similar to that shown in U.S. Pat. No. 2,846,778. The cooler 1 includes a housing 2 which defines a chamber and is provided with a grate 3 on the inside thereof. The housing includes an inlet 5 for admitting cement clinker from a kiln (not shown) into the housing 2 and onto the grate 3. The grate 3 may be movable by any suitable means such as a reciprocating drive (not shown) so that the cement clinker will be advanced through the housing 2 to an outlet 6 which discharges cooled cement clinker.

A plurality of blowers or fans 10, 11 and 12 are flow connected to the bottom of the housing 2 and blow cool air through the hot cement clinker to cool the clinker. Partitions 4 divide the lower portion of the housing 2 into a plurality of chambers. Each of the blowers 11 and 12 is volumetrically controlled by any suitable means such as that shown in U.S. Pat. No. 3,485,192 so that the volume of air in the chamber in which it is in communication is maintained constant. Thus, if there is a "hole" in the clinker to be cooled, the dividers 4 prevent all the air below the porous grate 3 from passing through that "hole" and preventing most of the cement clinker from being cooled. By maintaining the air volume in each chamber constant, proper cooling of the cement clinker is assured.

The blower 10 is pressure controlled so that the volume of air supplied by blower 10 is sufficient to maintain a slight and constant pressure at the entrance to duct 15. The volume of air going to the kiln will vary over a wide range and in order to prevent a closed system from being established, the volume of air supplied by the blower 10 should equal the volume of air going to the kiln.

As the cool air passes through the hot clinker, it is heated to a high temperature. A portion of the heated air is directed through an outlet conduit 15 and returned to the kiln (not shown) to be used in the cement making process. The remainder of the heated air with its entrained dust and solids is vented from the clinker cooler 1 through a conduit 18.

The hot air and its entrained solids pass from the outlet or first conduit 18 to a mechanical dust collector 25. This dust collector may be any conventional mechanical filter such as a cyclone cleaner. It should not, however, be a bag house filter because the gas exhausted from the clinker cooler may be at such a high temperature that a bag house will be burned out. From the dust collector 25 the hot air passes through conduit 19 to a cooler 26.

Figure 2:
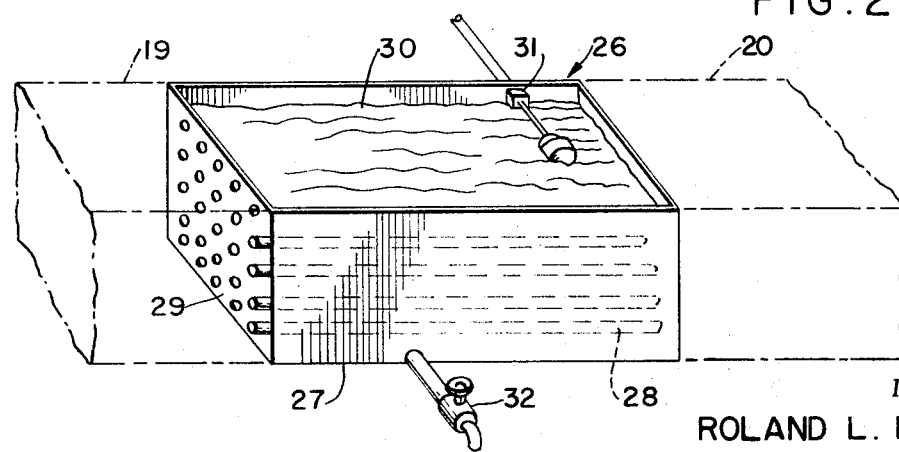
FIG. 2 is a perspective view of the gas cooler of the present invention.

The preferred form of the cooler 26 is illustrated in FIG. 2 and includes a tank 27 which is open at its top. The tank is provided with a plurality of air conducting tubes 28 passing therethrough. The tubes 28 are suitably secured in the end walls 29 of the tank 27 and are flow connected with the gas conduit 19 so that as the hot air is exhausted from the dust collector 25, it enters the tubes 28, passes through the tank 26 and into a second conduit 20. The tank 27 is filled with a cooling fluid such as water 30 which surrounds the tubes 28. Thus, as the air passes through the tubes 28, it is cooled by the water 30 in the tank 27. Because the air is of such a high temperature, the water in the tank 27 will be boiled off. By using an open top container and allowing the water to boil off, the system takes advantage of the large heat of conversion from water to vapor not present with closed circuit water circulating coolers. A float controlled water supply conduit 31 is provided to maintain the proper water level in the tank 27. A drain 32 is provided in the bottom of the tank 27 so that minerals and foreign matter which remain as the water boils off may be drained from the tank 27.

The cooled air discharged from the cooler 26 passes through conduit 20 to a plenum chamber 35. A plurality of blowers 11 receive the cooled air from the plenum 35 through conduits 36 and discharge it into the clinker cooler 1 to cool a new supply of hot clinker and the process repeats. In order to maintain the proper flow of air through the system, a blower 38 is provided in the conduit 20.

The air discharged from the cooler 26 will be in the neighborhood of 250° F. In most cement making operations, it is desired to cool the cement clinker to a temperature of about 150° F. In order to achieve this final temperature, a blower 10 blows ambient air through the cement clinker just before it is discharged from the clinker cooler 1. In an effort to keep the grates 3 from being heated to too high a temperature, in some instances, it may be desirable to use a blower 12 to blow ambient air through the cement clinker at the point of entry of hot clinker into the clinker cooler 1. It is believed, however, that such an arrangement is not necessary and the blower 12 may be connected to the plenum chamber 35.

In the embodiment shown in FIG. 1, a mechanical dust collector is used. It is generally known that mechanical dust collectors of the type contemplated in the present invention do not remove all of the solid foreign matter from the air. Thus, there will be a certain amount of dust circulating in the system. It is believed, however, that this will not affect the cement clinker and, if proper precautions are taken with the blowers 11 and 35, it will not be damaging to the blowers. The cement clinker will serve as an additional filter for the air circulating in the system and hence, although there will be an initial buildup of dust in the air recirculated through the clinker cooler, this buildup will level off at an acceptable point.

Although in the embodiment of FIG. 1 the dust collector 25 has been shown as located before the cooler 26, the dust collector can be located in the conduit 20 after the cooler 26. It is preferable to locate the dust collector before the air enters the cooler to eliminate the possibility that the tubes 28 of the cooler will be damaged.

Figure 3:
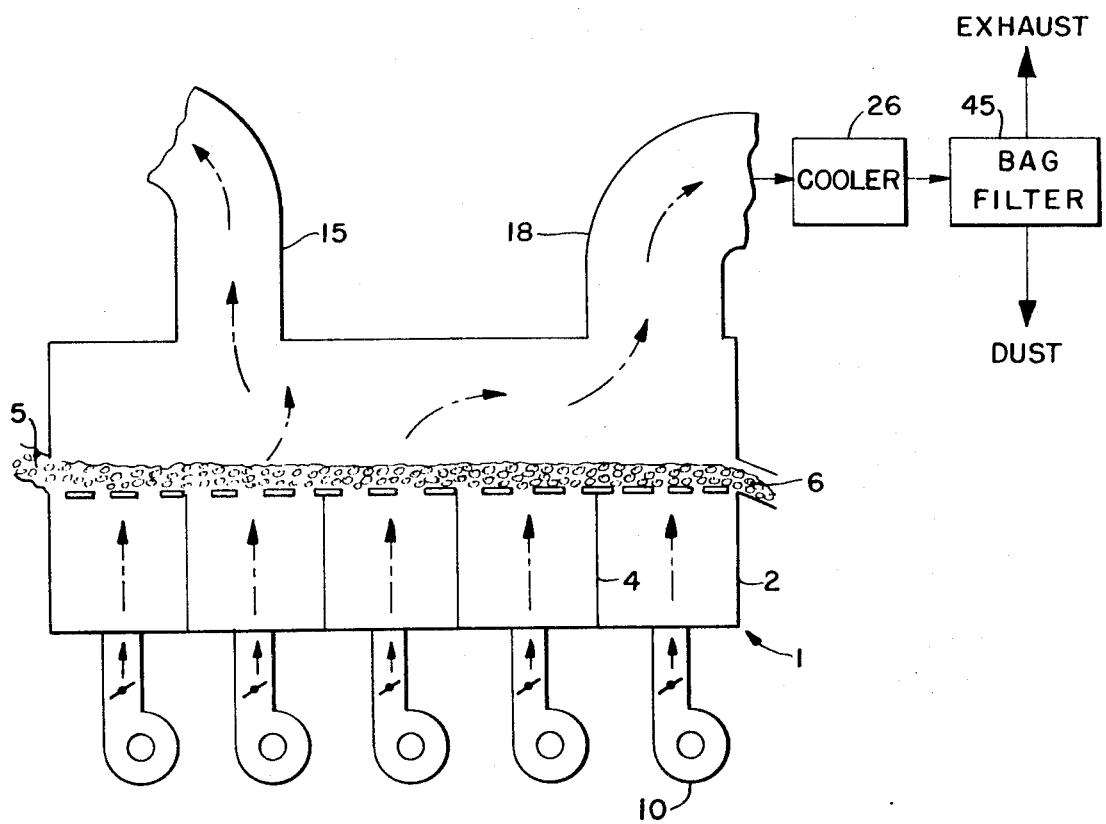
FIG. 3 is a schematic view of a modification of the clinker cooling system of the present invention.

In the embodiment of FIG. 3, a clinker cooler similar to that shown in FIG. 1 is employed. In this embodiment, however, the air is not recirculated. The hot gases from the clinker cooler 1 are vented through conduit 18 directly to a gas cooler 26. From the cooler 26 the cooled gas is conducted to a bag house filter 45. From the bag house filter the cleaned air is exhausted to atmosphere and the dust is removed for disposal. Ambient air is continuously blown through the hot cement clinker. The cooler 26 reduces the temperature of the hot gas vented from the clinker cooler 1 to a temperature sufficiently low to permit use of a less expensive bag house. This is true even during flooded conditions. Although this embodiment does not save as much on initial investment costs, it is believed that for many cooling operations this arrangement will be preferable.

Although a particular type of cooler has been shown and described, it is to be understood that other coolers may be used. An important feature of the invention is that an indirect heat exchanger is employed as opposed to a direct contact type heat exchanger. If desired, the water could flow through tubes and the heated gas flow around the cool tubes. The important feature is that the cooler be able to cool the heated air even during flooded conditions.

It should also be understood that the invention may be employed in cooling materials other than cement clinker.

From the foregoing, it is apparent that the objects of the present invention have been carried out. It is intended that the foregoing be merely a description of the preferred form of the invention but that the invention be limited solely by the appended claims.

I claim:

1. Apparatus for cooling cement clinker comprising:
   a housing defining a chamber;
   inlet means at one end of said housing for receiving cement clinker from a kiln and admitting it into said chamber;
   outlet means at the other end of said housing for discharging cooled cement clinker from said chamber;
   grate means for supporting said clinker within said chamber;
   blower means for blowing cooling gas into said chamber and through said cement clinker for cooling said cement clinker whereby said gas is heated by said clinker and solid material is entrained in said gas;
   an outlet conduit means for conducting at least some of the heated gas to a kiln;
   a gas cooler;
   first conduit means for conducting at least some of said heated gas from said chamber to said gas cooler;
   second conduit means for conducting cooled gas from said gas cooler to said blower means;
   dust collector means flow connected to one of said first and second conduit means for removing solid materials from said gas; and
   second blower means for blowing ambient air into said chamber adjacent said outlet means.

2. The apparatus of claim 1 wherein said gas cooler is an indirect heat exchanger.

3. The apparatus of claim 2 wherein said indirect heat exchanger includes tank means having a plurality of gas conducting tubes extending therethrough which are flow connected to said first and second conduit means and cooling fluid fills said tank and surrounds said gas conducting tubes.

4. The apparatus of claim 3 wherein said cooling fluid is water and said tank means includes means responsive to the level of water in said tank for conducting water into said tank.

5. The apparatus of claim 1 wherein said dust collector means is flow connected to first conduit means.

6. The apparatus of claim 5 further comprising third blower means mounted in said second conduit for moving cooled air from said air cooler to said first blower means.

7. The apparatus of claim 5 wherein said first and second blower means are volumetric controlled for maintaining the air volume in said chamber substantially constant.

8. The apparatus of claim 1 further comprising means for blowing ambient air into said chamber adjacent said inlet means.

9. A method of cooling hot coarse material such as cement clinker comprising the steps of:
supporting a supply of hot material on a porous grate;
blowing cooling air upwardly through the porous grate and hot material by means of a first blower means whereby the hot material is cooled, the cooling air is heated and solid material is entrained in the air;
removing at least some of the solid material from the air which passes through the hot material;
cooling the heated air by means of an indirect heat exchanger;
returning the cooled air to the first blower means and blowing it through a new supply of hot material to be cooled; and
blowing ambient air through a supply of hot material by means of a second blower means before cooling air is blown through the supply of hot material by the first blower means.

10. A method of cooling hot coarse material as defined by claim 9 further comprising the step of blowing ambient air through a supply of hot material by means of a third blower means after cooling air is blown through the supply of hot material by the first blower means.

11. Apparatus for cooling hot coarse material such as cement clinker comprising:
a housing defining a chamber;
inlet means at one end of said housing for receiving hot material from a furnace and admitting it into said chamber;
outlet means at the other end of said housing for discharging cooled material from said chamber;
grate means for supporting said material within said chamber;
blower means for blowing cooling gas into said chamber and through said material for cooling said material whereby said gas is heated by said hot material and solid material is entrained in said gas;
an outlet conduit means for conducting at least some of the heated gas to a furnace;
a gas cooler;
first conduit means for conducting at least some of said heated gas from said chamber to said gas cooler;
second conduit means for conducting cooled gas from said gas cooler to said blower means;
dust collector means flow connected to one of said first and second conduit means for removing at least some of the solid materials from said gas; and
second blower means for blowing ambient cooling gas into said chamber adjacent said inlet means.

* * * * *